United States Patent [19]

Hirakura et al.

[11] Patent Number: 5,408,584
[45] Date of Patent: Apr. 18, 1995

[54] FUZZY INFERENCE SYSTEM

[75] Inventors: Ryoichi Hirakura; Masanari Oh, both of Fukuoka, Japan

[73] Assignee: ROHM Co., Ltd., Kyoto, Japan

[21] Appl. No.: 144,648

[22] Filed: Oct. 28, 1993

[30] Foreign Application Priority Data

Feb. 2, 1993 [JP] Japan .................................. 5-015622

[51] Int. Cl.⁶ .............................................. G06F 15/18
[52] U.S. Cl. .......................................... 395/3; 395/11; 395/900
[58] Field of Search ............................... 395/3, 11, 900

[56] References Cited

U.S. PATENT DOCUMENTS 5,131,071 7/1992 Tsutsumi et al. ..................... 395/3
5,167,005 11/1992 Yamakawa ............................. 395/3

OTHER PUBLICATIONS

Current–Mode Analog Fuzzy Hardware with Voltage Input Interface and Normalization Locked Loop M.Sasaki Feb. 1992 IEEE.

Primary Examiner—Allen R. MacDonald
Assistant Examiner—Richemond Dorvil
Attorney, Agent, or Firm—Brumbaugh, Graves, Donohue & Raymond

[57] ABSTRACT

A fuzzy inference unit includes membership function generation circuits, each of an analog type operable in an electric voltage mode. The fuzzy inference device includes thereon a sweep signal generation circuit, switches for switching the input to the membership function generating circuits between the output of the sweep signal generation circuit and an external input, and membership function observing terminals for taking out externally the outputs of the membership function generation circuits. Due to the fact that the sweep signal generation circuit is provided on the fuzzy inference unit, even if a function generator is not prepared externally, the shape of the membership function can be observed.

3 Claims, 3 Drawing Sheets

FUZZY INFERENCE SYSTEM

BACKGROUND OF THE INVENTION

1. Field of the Invention

The present invention relates to a system which realizes the application of a fuzzy theory in terms of hardware.

2. Description of Related Art

In recent years, the application of a fuzzy theory, which is able to treat equivocal knowledge or information by quantifying the same, has been realized in the fields of home electric appliances and plant control. The practical application of the fuzzy theory includes both hardware application and software application and, recently, there has been introduced hardware for exclusive fuzzy use due to demand for increased speed or the like. The exclusive hardware includes analog and digital types of hardware. The present invention relates to the fuzzy hardware of an analog type.

To execute a fuzzy inference, at least, there are necessary a part (a membership function generation circuit) which calculates the goodness of fit between an input value and the membership function of an antecedent part, a part (a minimum value operation circuit) which finds an inference result for every rule, a part (a maximum value operation circuit) which integrates a plurality of inference results, and a part (a non-fuzzing circuit) which non-fuzzes the inference result. If these parts are arranged as a system, then the system is able to execute inference.

In the hardware of an analog type, the value of the membership function is expressed in terms of an analog voltage and a concrete membership function generation circuit is composed of a differential amplifier circuit, an operational amplifier circuit, or the like. Such membership function generation circuit outputs one membership function value for each externally applied input value.

On the other hand, since the shape of the membership function differs according to the object thereof, it is necessary to adjust the membership function shape and, in such shape adjustment, it is convenient to be able to observe the shape of the whole of the membership function. Thus, conventionally, in order to observe the shape of the whole of the membership function set at a glance, a sweep signal generated by a function generator provided externally is input to a membership function generation circuit and the output of the membership function generation circuit is observed on a time axis by means of an oscilloscope or the like. An example of conventional observation of the shape of the membership function is shown in FIG. 6 in which a function generator 100, membership function generator 210 in a fuzzy inference device, and an oscilloscope 300 are connected.

However, in the above-mentioned conventional method, it is necessary to prepare the function generator for generating the sweep signal in addition to a fuzzy inference unit.

SUMMARY OF THE INVENTION

In view of this, the present invention aims at eliminating the above problem found in the conventional method. Accordingly, it is an object of the invention to provide a fuzzy inference system comprising a fuzzy inference unit which is able to observe the shape of a membership function set without preparing a function generator externally thereof.

In attaining the above object, according to the invention, there is provided a fuzzy inference system comprising a fuzzy inference unit which includes a membership function generation circuit of an analog type operable in an electric voltage mode, the fuzzy inference unit including thereon a sweep signal generation circuit, switching means respectively for switching the output of the sweep signal generation circuit and an external input, and membership function observing terminals respectively for taking out the output of the membership function generation circuit.

If the output of the sweep signal from the sweep signal generation circuit is connected to the input terminal of the membership function generation circuit, then an output voltage with respect to the input voltage is input to the membership function observing terminals. If the output voltage is connected to an oscilloscope or a similar device, then the membership function can be observed on a time axis.

On the other hand, in executing a fuzzy inference, the sweep signal generation circuit is cut off from the input terminals of the membership function generation circuit, and the value of an antecedent variable is input. The switching of the input signal of the membership function generation circuit is executed by use of the above switching means.

DETAILED DESCRIPTION OF THE PREFERRED EMBODIMENT

Description will be given hereinbelow in concrete of the invention by way of an embodiment shown in the accompanying drawings.

Figure 1:
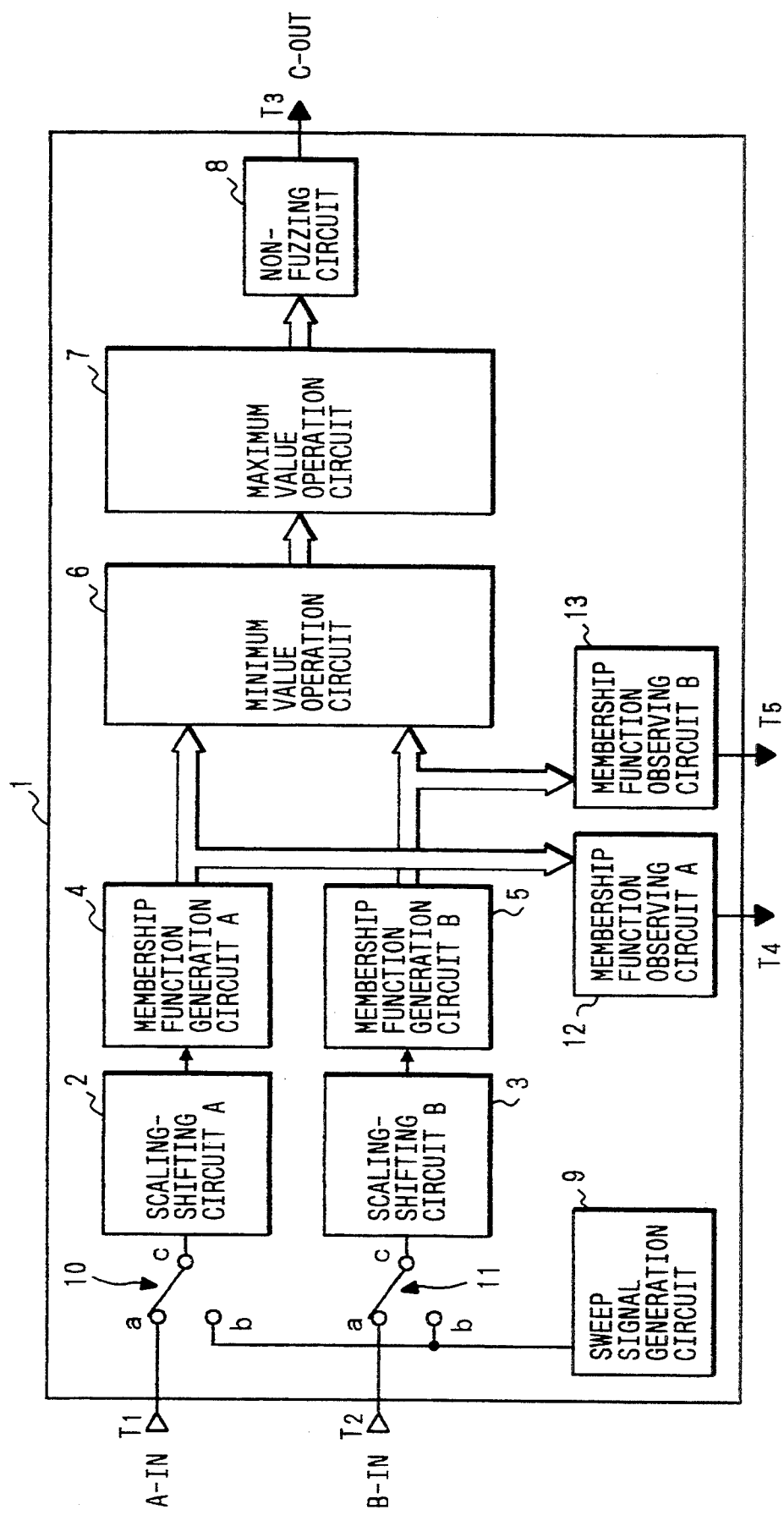
FIG. 1 is a block diagram of an embodiment of a fuzzy inference system according to the invention.

In FIG. 1, there is shown a block diagram of an embodiment of a fuzzy inference system which includes a sweep signal generation circuit and two variable inputs. In FIG. 1, reference character 1 designates a fuzzy inference unit, 2 and 3 respectively scaling-shifting circuits which are used to match an input value from externally to the input range of a membership function generation circuit, 4 and 5 respectively membership function generation circuits, 6 a minimum value operation circuit, 7 a maximum value operation circuit, 8 a non-fuzzing circuit, 9 a sweep signal generation circuit, 10 and 11 respectively change-over switches which are used to switch an input and a sweep signal, 12 and 13 respectively membership function observing circuits, $T_1$ and $T_2$ respectively input terminals, $T_3$ an output terminal, and T₄ and T₅ respectively membership function observing terminals.

Referring now to the circuit shown in FIG. 1, inputs A-IN, B-IN input from the input terminals $T_1$, $T_2$ are respectively output from a system which is provided upstream system, in the membership function observing terminals $T_4$, $T_5$ the membership function can be observed, and, as an output C-OUT to be output to the output-terminal $T_3$, a determinate value to be output from the non-fuzzing circuit 8 is output.

Figure 2:
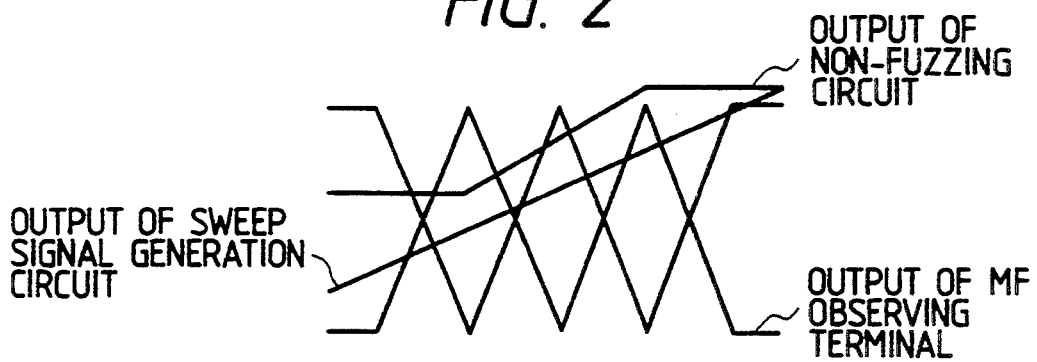
FIG. 2 is a waveform chart of the embodiments of the output waveforms of membership function observing terminals respectively employed in the embodiment shown in FIG. 1.

Now, if the switches 10, 11, into which the inputs A-IN, B-IN are input, are turned down to the b sides thereof respectively, then the portions thereof extending between b and c are allowed to conduct, with the result that the sweep signal from the sweep signal generation circuit 9 is input to the membership function generation circuits 4, 5. This makes it possible to set a membership function necessary to execute a fuzzy inference. To the membership function observing terminals $T_4$, $T_5$ there are output such membership function as shown in FIG. 2. Also, if the change-over switches 10, 11 are turned to the a sides thereof respectively, then the portions thereof extending between a and c are allowed to conduct, with the result that the input voltages of the inputs A-IN, B-IN respectively input from the input terminals $T_1$, $T_2$ allow the determinate value to be output as the output value of the non-fuzzing circuit 8.

Figure 3:
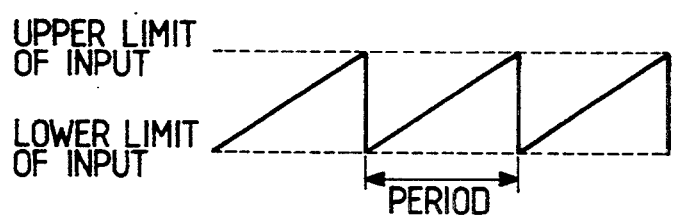
FIG. 3 is a waveform chart of an embodiment of a sweep signal employed in the invention.
Figure 4:
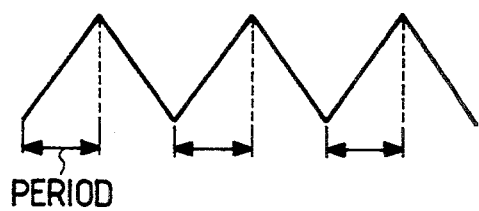
FIG. 4 is a view of an embodiment of a triangular waveform which is used instead of the sweep signal.

As the sweep signal to be used in the above-mentioned operation, there is used a signal which increases linearly within the cycle of such an input value as shown in FIG. 3, that is, within the cycle extending from the lower limit of the input value to the upper limit thereof. Alternatively, as shown in FIG. 4, a part of a triangular wave can be used as the sweep signal. If such sweep signal is input, then the membership function generation circuits 4, 5 respectively output membership values according to the values of the sweep signals at the respective times. The output membership values are output as time series values through the membership function observing circuits 12, 13 to the membership function observing terminals $T_4$, $T_5$, respectively. If these values are observed by means of an oscilloscope or a similar device, then the shape of the whole of the membership function can be observed at a glance.

Figure 5A:
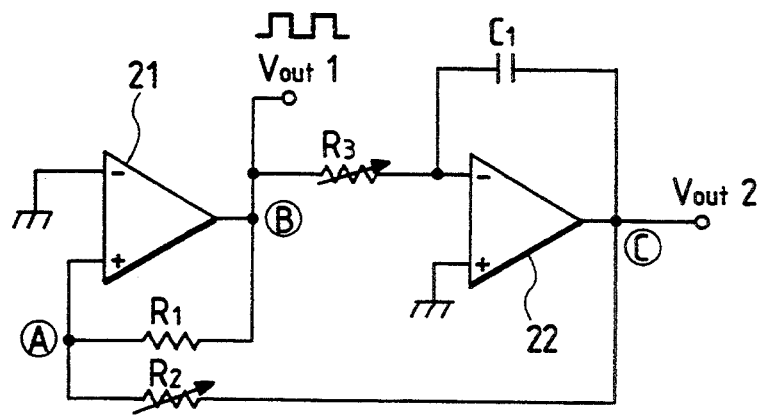
FIG. 5A is a circuit diagram of an embodiment of a sweep signal generation circuit according to the invention.
Figure 5B:
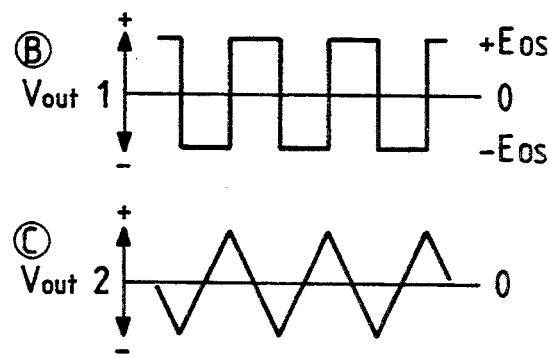
FIG. 5B shows waveforms of the sweep signal generation circuit.
Figure 6:
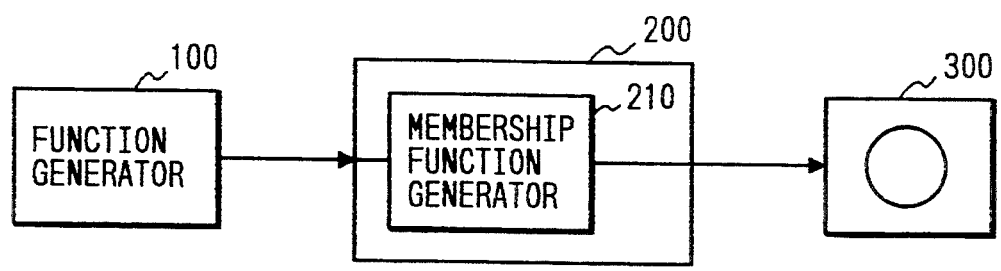
FIG. 6 shows a conventional example of observation way of shape of the whole of the membership function.

Now, in FIG. 5A, there is shown an embodiment of the sweep signal generation circuit 9. An operational amplifier 21, which is provided in the front section of the circuit 9, works as a Schmitt circuit and outputs a square wave to one output terminal $V_{OUT}$ of the circuit 9. Another operational amplifier 22, which is provided in the rear section of the circuit 9, is an integration circuit which integrates the output (that is, the square wave) of the front section to thereby output a triangular wave to the other output terminal $V_{OUT}$ of the circuit 9 as shown in FIG. 5B. By changing the values of resistances $R_2$ and $R_3$, the frequency and amplitude of the output of the circuit 9 can be adjusted.

In the above-mentioned embodiment, the sweep signal generation circuit 9 is provided on the fuzzy inference substrate 1. However, it is not always necessary the circuit 9 must be provided on the same substrate, but the circuit 9 may be provided in or on other member, provided that the circuit 9 is disposed within the same fuzzy inference unit.

As has been described heretofore, according to the invention, due to the fact that a sweep signal generation circuit is built in a fuzzy inference unit, even if a function generator is not prepared externally, the shape of a membership function can be observed.

What is claimed is:

1. A fuzzy inference system comprising:
   a fuzzy inference unit including:
   a plurality of membership function generation circuits, each of an analog type operable in an electric voltage mode;
   a sweep signal generation circuit for generating a sweep signal;
   a plurality of switching means for switching inputs to the membership function generating circuits, respectively, between said sweep signal from said sweep signal generation circuit and an external input; and
   a plurality of membership function observing terminals for outputting outputs of said membership function generation circuits, respectively.

2. A fuzzy inference system as claimed in claim 1, wherein said fuzzy inference unit comprises at least two sets of said membership function generation circuit, switching means and membership function observing terminal.

3. A fuzzy inference system as claimed in claim 1, wherein said membership function generating circuits calculate a fit between an input and an antecedent part, and said fuzzy inference system further comprises a minimum value operation circuit for finding an inference result, a maximum value operation circuit for integrating a plurality of inference results, and a non-fuzzing circuit for making non-fuzzy the inference result.

* * * * *